United States Patent [19]

Decker, Jr.

[11] Patent Number: 5,159,401
[45] Date of Patent: Oct. 27, 1992

[54] ELEVATION-ANGLE SENSING, CELESTIAL NAVIGATION AND SURVEYING

[76] Inventor: John A. Decker, Jr., 307 S. Alu Rd., Wailuku, Hi. 96793

[21] Appl. No.: 578,182

[22] Filed: Sep. 6, 1990

[51] Int. Cl.[5] ............................................. G01B 11/26
[52] U.S. Cl. ...................................... 356/140; 33/282
[58] Field of Search ............... 356/138, 140, 147, 148, 356/248, 249; 33/281, 282, 283, 284

[56] References Cited

U.S. PATENT DOCUMENTS

| | | | |
|---|---|---|---|
| 2,941,297 | 6/1960 | Howley | 33/73 |
| 2,995,992 | 8/1961 | Merritt | 95/11 |
| 3,015,457 | 1/1962 | Dixson | 244/14 |
| 3,027,841 | 4/1962 | Dixson | 102/50 |
| 3,194,949 | 7/1965 | Jasperson | 235/151 |
| 3,214,575 | 10/1965 | Seliger et al. | 235/151 |
| 3,249,326 | 5/1966 | Reister | 244/77 |
| 3,360,638 | 12/1967 | Lillestrand et al. | 235/150 |
| 3,571,567 | 3/1971 | Eckermann | 235/150 |
| 3,713,740 | 1/1973 | Lillestrand et al. | 356/144 |
| 3,744,740 | 7/1973 | Godin et al. | 244/3 |
| 3,752,591 | 8/1973 | Feldman | 356/247 |
| 3,769,710 | 11/1973 | Reister | 33/320 |
| 3,854,037 | 12/1974 | Feldman et al. | 235/150 |
| 3,858,334 | 1/1975 | Eisenhauer | 35/44 |
| 3,863,364 | 2/1975 | King | 35/43 |
| 3,912,397 | 10/1975 | Zoltan | 356/141 |
| 3,968,570 | 7/1976 | Leuchter, Jr. | 33/267 |
| 3,985,446 | 10/1976 | Feldman et al. | 356/144 |
| 4,012,851 | 3/1977 | Eisenhauer | 35/44 |
| 4,082,462 | 4/1978 | Owen | 356/152 |
| 4,083,121 | 4/1978 | Eisenhauer | 35/44 |
| 4,083,636 | 4/1978 | Owen | 356/141 |
| 4,104,722 | 8/1978 | Evans | 364/455 |
| 4,123,164 | 10/1978 | Tambor | 356/152 |
| 4,171,907 | 10/1979 | Hill et al. | 356/5 |
| 4,197,653 | 4/1980 | Laxo | 33/268 |
| 4,702,011 | 10/1987 | Sigley | 33/268 |
| 4,707,926 | 11/1987 | Decker, Jr. | 33/267 |
| 4,717,251 | 1/1988 | Wells et al. | 356/4 |
| 4,763,418 | 8/1988 | Decker, Jr. | 33/268 |
| 4,837,717 | 6/1989 | Wiklund et al. | 364/563 |

FOREIGN PATENT DOCUMENTS

| | | | |
|---|---|---|---|
| 569663 | 1/1959 | Canada | 356/147 |
| 361467 | 6/1931 | United Kingdom . | |
| 556034 | 9/1943 | United Kingdom . | |
| 2062861 | 5/1981 | United Kingdom . | |

OTHER PUBLICATIONS

Spectron Glass and Electronics, Inc. catalog entitled "Electrolytic Tilt Sensors" (with a one-page insert entitled Universal Signal Conditioner MUPI-2).
Spectron Glass and Electronics Incorporated-catalog of goods, pp. 6—13.

Primary Examiner—F. L. Evans
Attorney, Agent, or Firm—Fish & Richardson

[57] ABSTRACT

The invention features an elevation-sensing system comprising an elevation-sensing instrument which includes a sighting device having an optical axis for aiming at an object and an electronic elevation-angle sensor attached to the sighting device and having an electrical characteristic indicative of elevation angle relative to an axis of the electronic elevation-angle sensor and a repeatability of at least 6 arcminutes over an angular range of said electronic elevation-angle sensor, and a processor for deriving an elevation angle from the electrical characteristic.

29 Claims, 6 Drawing Sheets

FIG 6

ELEVATION-ANGLE SENSING, CELESTIAL NAVIGATION AND SURVEYING

BACKGROUND OF THE INVENTION

This invention relates to elevation-angle sensing instruments.

In celestial navigation, for example, a navigator traditionally has fixed his position on the earth's surface by using a marine-type sextant to measure the angles above the actual horizon of at least two celestial bodies, typically stars, planets, the sun, or the moon. Alternatively, the sextant was of the bubble type, which measures the angles relative to an artificially created horizon. Each measured angle, together with the time of its measurement, was used to ascertain a line of position using pre-calculated tables, a calculator, or a computer built into the sextant. Measuring the angle between the celestial body and the horizon and calculating position have been performed manually and, recently, electronically.

In surveying and construction, the measured angle between an artificially created horizon and an observed point (such as the top of a building or landmark) has been used to ascertain the elevation of the observed point.

SUMMARY OF THE INVENTION

In general, in one aspect, the invention features an elevation-angle sensing instrument comprising a sighting device having an optical axis for aiming at an object and an electronic elevation-angle sensor attached to the sighting device and having an electrical characteristic indicative of an elevation angle with respect to the optical axis and a repeatability of at least 6 arcminutes over the sensor's angular range.

Preferred embodiments include the following features. The electronic elevation-angle sensor is an electrolytic tilt sensor having a repeatability of at least 1 arcminute over its angular range, and an angular range of ±30 degrees, and preferably ±60 degrees, from an axis of the electronic elevation-angle sensor. In some embodiments, the sighting device is a telescope and, in other embodiments, an infrared detector.

In general, in another aspect, the invention features a sextant comprising a sighting device having an optical axis for aiming at an object, and an electrolytic tilt sensor attached to the sighting device and having an angular range of at least ±30 degrees from an axis of the electrolytic tilt sensor and a repeatability of at least 6 arcminutes over its angular range.

Preferred embodiments include the following features. The electrolytic tilt sensor has an angular range of at least ±60 degrees from the axis of the electrolytic tilt sensor and a repeatability of at least 1 arcminute over its angular range.

In general, in another aspect, the invention features an elevation-angle sensing system comprising an elevation-sensing instrument which includes a sighting device having an optical axis for aiming at an object and an electronic elevation-angle sensor attached to the sighting device and having an electrical characteristic indicative of elevation angle relative to an axis of the electronic elevation-angle sensor and a repeatability of at least 6 arcminutes over an angular range of the electronic elevation-angle sensor, and a processor for deriving an elevation angle from the electrical characteristic.

Preferred embodiments include the following features. The system further comprises a processor for deriving a true elevation angle and includes a look-up table, in some embodiments, and a celestial height of a celestial body, in other embodiments, from the electrical characteristic. The system further comprises a clock connected to the processor for deriving the elevation angle and having an electric output indicative of time. The processor comprises, in some embodiments, means for deriving a line of position and, in other embodiments, means for deriving a position on the surface of the earth, from the electrical characteristic and the electric output. The electronic elevation-angle sensor is an electrolytic tilt sensor having a repeatability of at least 1 arcminute over its angular range, and an angular range of at least ±30 degrees, and preferably ±60 degrees, from an axis of the electronic elevation-angle sensor. The sighting device comprises, in some embodiments, a telescope and, in other embodiments, an infrared image converter. The system further comprises a display connected to the processor for deriving the elevation angle.

In general, in another aspect, the invention features a method for determining the celestial height of a celestial body, comprising the steps of establishing a line of sight to a celestial body, ascertaining an elevation angle between the line of sight and the zenith using an electronic elevation-angle sensor, and calculating a celestial height based on the elevation angle.

In general, in another aspect, the invention features a method for determining the celestial height of a celestial body, comprising the steps of developing a look-up table correlating a plurality of elevation angles as measured by an electronic elevation-angle sensor with true elevation angles, establishing a line of sight to a celestial body, ascertaining an elevation angle between the line of sight and the zenith using the electronic elevation-angle sensor, converting the elevation angle between the line of sight and the zenith to a true elevation angle using the look-up table, and calculating a celestial height based on the true elevation angle.

In general, in another aspect, the invention features a method for deriving a line of position, comprising the steps of establishing a line of sight to a celestial body, ascertaining an elevation angle between the line of sight and the zenith using an electronic elevation-angle sensor, determining the time at which the elevation angle is ascertained, and deriving a line of position using the elevation angle and the time.

In general, in another aspect, the invention features a method for deriving a line of position, comprising the steps of developing a look-up table correlating a plurality of elevation angles as measured by an electronic elevation-angle sensor with true elevation angles, establishing a line of sight to a celestial body, ascertaining an elevation angle between the line of sight and the zenith using the electronic elevation-angle sensor, determining the time at which the elevation angle is ascertained, converting the elevation angle between the line of sight and the zenith to a true elevation angle using the look-up table, and deriving a line of position using the true elevation angle and the time.

In general, in another aspect, the invention features a method for celestial navigation, comprising the steps of establishing a line of sight to a celestial body, ascertaining an elevation angle between the line of sight and the zenith using an electronic elevation-angle sensor, determining the time at which the elevation angle is ascertained, and deriving a position on the surface of the earth using the elevation angle and the time.

In general, in another aspect, the invention features a method of celestial navigation, comprising the steps of developing a look-up table correlating a plurality of elevation angles as measured by an electronic elevation-angle sensor and true elevation angles, establishing a line of sight to a celestial body, ascertaining an elevation angle between the line of sight and the zenith using the electronic elevation-angle sensor, determining the time at which the elevation angle is ascertained, converting the elevation angle between said line of sight and the zenith to a true elevation angle using the look-up table, and deriving a position on the surface of the earth using the true elevation angle and the time.

The invention offers advantages, both in terms of making many activities possible or less difficult and in terms of permitting the realization of cost savings. The invention takes advantage of electrolytic tilt sensors that are very precise (i.e., that have very high repeatability) over a large angular range.

The electronic elevation-angle sensor used with the invention indicates the angle between an object and the zenith at any time that the object is observed and the sensor activated. Hence, to obtain an accurate measure of the angle between the object and the zenith, it is only necessary to observe the object for long enough to activate and attain an output from the sensor, which can then be converted to an accurate measure of the angle.

The invention thus eliminates the need, encountered in celestial navigation with a marine-type sextant, to sight both a celestial body (for example, a star, a planet, or the sun) and the horizon simultaneously. The invention makes it possible to navigate when the horizon cannot be observed, such as when rain, haze, clouds, or land masses obscure the horizon, and on land, where the horizon can seldom be seen. To use the invention, it is only necessary that the celestial body can be observed. This is particularly helpful for celestial navigation using stars and planets, because it is generally only during the brief periods of dawn and dusk that these bodies can be seen simultaneously with the horizon.

The invention permits measurement of the angle between a celestial body and the zenith to be made on a point-and-shoot basis, because it is only necessary for the celestial body to be visible for long enough to observe it with a sighting device and obtain an output from the electronic elevation-angle sensor indicative of the angle. Thus, the invention permits navigation to be conducted under rapidly changing circumstances, such as when there are only occasional breaks in cloud cover.

Moreover, the invention is not particularly dependent upon calm conditions, as it is not necessary for the invention to be held in a horizontal position when a body is observed. As a result, the invention can be used under some conditions that would previously have made navigating and surveying difficult or impossible. In particular, the invention permits navigation to be performed under rythmically unstable conditions where navigation would not be possible with sextants having "artificial horizons" or with "bubble sextants"; these devices, while eliminating the need to observe the horizon, are subject to errors caused by resonance with vessel motions, and generally require quited calm conditions.

Additionally, when the invention is equipped with an infrared image convertor, it is capable of taking sights of the sun through solid cloud cover up to the thickness at which the sun is undetectable by the infrared image convertor and/or in fog of similar thickness. Both weather conditions have traditionally precluded the use of celestial navigation using previous techniques for almost any thickness of cloud cover or fog.

The invention, moreover, allows significant cost savings to be realized. The invention uses the precision (i.e., repeatability), rather than the absolute accuracy, of the elevation angle sensor to engage in activities (for example, navigating and surveying) where accurate measurements are required. Commercially available sensors with the requisite precision and angular range for these purposes are relatively inexpensive, apparently since they do not need to be extremely accurate. Moreover, these sensors can be combined with commercially available, and relatively inexpensive, sighting devices, such as sighting scopes and astronomical sighting telescopes, and with processors, which can be easily programmed and are relatively inexpensive, to make elevation-angle sensing instruments and systems. Such instruments and systems typically are less expensive than other devices, such as very accurate sextants and surveying devices, and systems of which they are a part. Moreover, the instrument eliminates the need and cost of having both a marine type sextant and an "artificial horizon" or "bubble" sextant for different conditions and uses.

The electronic elevation-angle sensors and sighting devices used in the invention are more durable than traditional sextants and surveying instruments that have many delicate components, and they are inherently less sensitive to corrosion and damage from the marine environment than other navigation systems. Hence, the invention's instruments and systems are less likely to be damaged though rough handling or in a marine or construction site environment, and more likely to give useful results.

The invention is easier to use than traditional alternatives. In using the invention to navigate, the user, after entering some preliminary information and instructions, sights the celestial body and presses a command button. It is not necessary to "swing the arc" or "bring the body down to the horizon", as there would be with a sextant. The results of the sighting are easy to use, since the processor could then compute and disclose the celestial height of the object, a line of position or the instrument, or its location on the surface of the earth. In surveying, the user similarly sights the object and presses a command button, whereupon the angle between the object and the zenith is obtained. In either use, moreover, once the instrument or system has first been calibrated to derive a look-up table, the table can be repeatedly re-used thereafter.

The invention offers similar advantages with respect to construction and surveying. By using electronic elevation-angle sensors such as electrolytic tilt sensors that have high repeatability, the invention can be used to achieve angular measurements with sufficient accuracy for surveying, while having a lower cost than other, more accurate devices. Also, the "point and shoot" feature of the invention discussed above may permit surveying to proceed more rapidly than is the case with devices using a null indicator.

Other advantages and features will become apparent from the following description of the preferred embodiment, and from the claims.

DESCRIPTION OF THE PREFERRED EMBODIMENT

We first briefly describe the drawings.

STRUCTURE AND OPERATION

Figure 1:
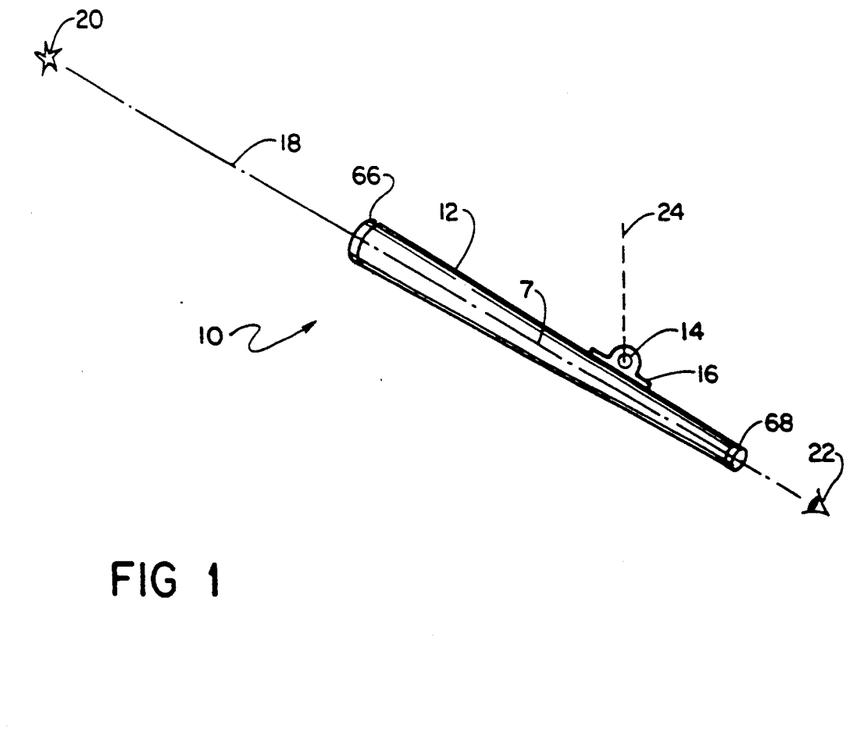
FIG. 1 is a schematic drawing of an elevation-angle sensing instrument.

Referring to FIG. 1, for celestial navigation an elevation-angle sensing instrument 10 includes a telescope 12 having an optical axis 7 that can be directed along line of sight 18 toward a celestial body 20 by a user 22. Telescope 12 is a spotting telescope or astronomical sighting telescope of the kind available from Edmund Scientific, Bausch & Lomb, or Celestron. Celestial body 20 could be a star, a planet, the sun, or the moon.

Figure 2:
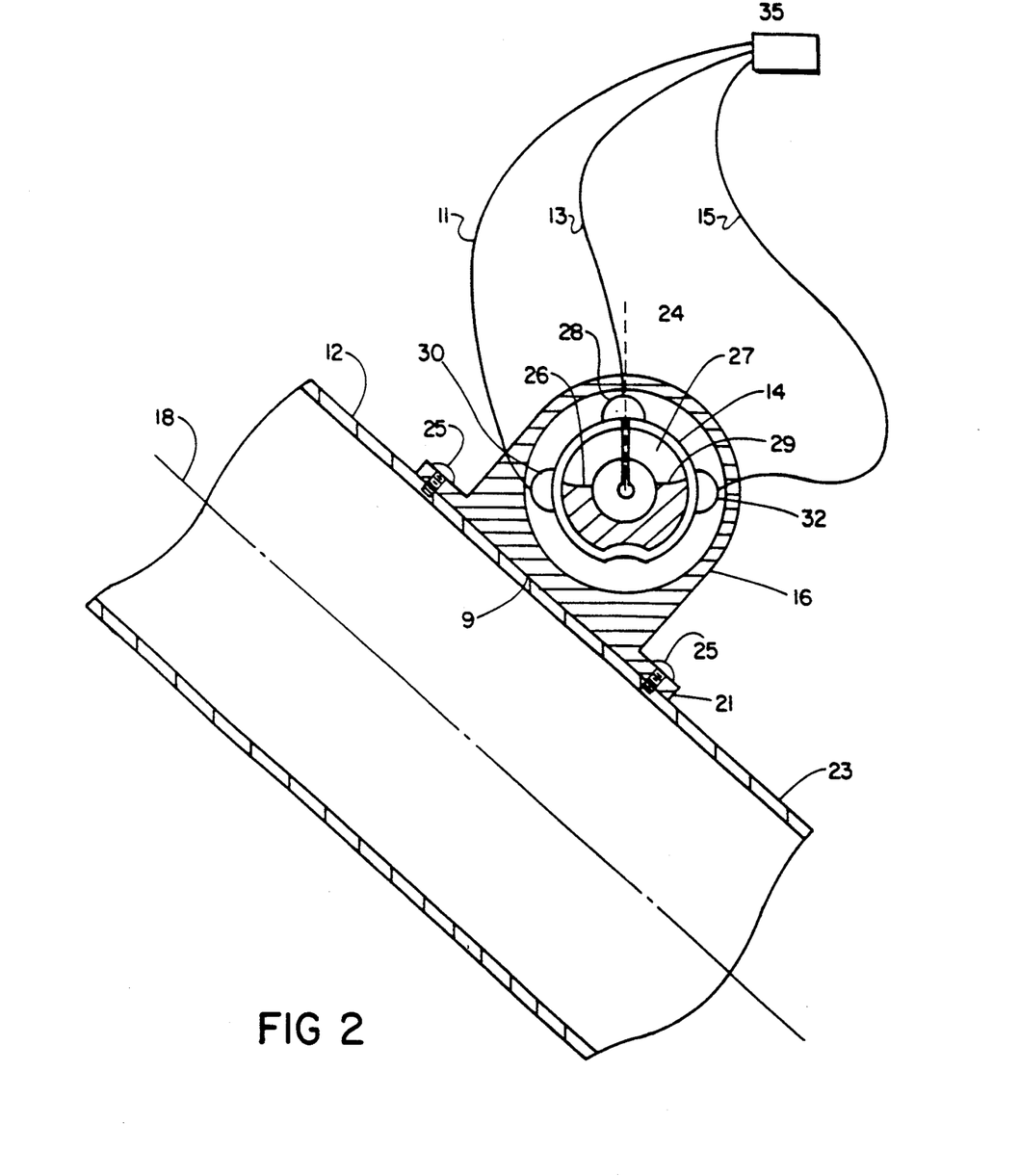
FIGS. 2 and 3 are side views, partially in section, of an electrolytic tilt sensor mounted on a telescope (shown in cutaway) with the telescope held respectively in different orientation.

Referring also to FIG. 2, an electrolytic tilt sensor 14 (Model L-211U from Spectron Glass and Electronics Inc., 595 Old Willets Path, Hauppauge, N.Y.) is attached to telescope 12 using a holder 16 (Spectron Model 557A). The base 21 of holder 16 is bonded to housing 23 with epoxy glue. Alternating current ("AC") is applied to sensor 14, which is generally disk-shaped and has an axis 24 corresponding to a zero tilt reading. The sensor has center electrode 28 and peripheral electrodes 30, 32, which are connected to signal conditioner (Spectron Model MUPI-2) 35 by lines 11, 13, 15. The sensor is held in the holder with axis 24 at roughly 45 degrees to the base surface 9 of holder 16.

Figure 3:
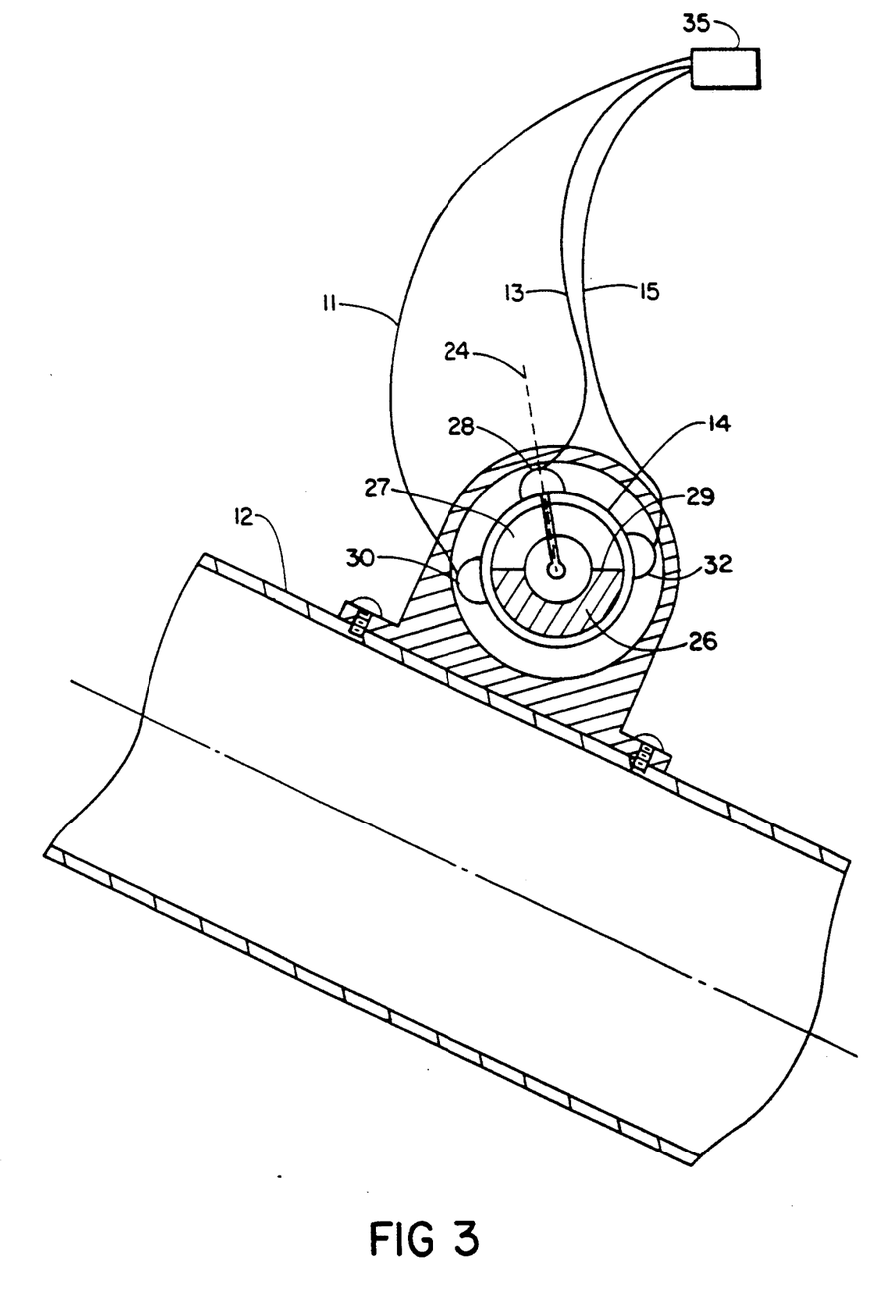

Referring to FIG. 3, when telescope 12 is held in a position (with a different elevation angle from the position of FIG. 2) at which axis 24 is not aligned with the zenith, the interface 29 between the fixed volume of electrolytically active fluid 26 and the gas 27 in sensor 14 reaches a new orientation determined by gravity. The new orientation causes the AC voltages between center electrode 28 and respective peripheral electrodes 30, 32 to shift because of the different resistances of electrolytically active fluid 26 and gas 27; and the resultant shift of AC voltage at center electrode 28 (from the zero tilt value of 50% of an excitation voltage applied to the sensor) is proportional to the shift in elevation angle.

The electrolytic tilt sensor has an elevation range of 60 degrees on either side of axis 24 (a range of at least 30 degrees on either side of the axis is required for navigation), with an accuracy of no better than approximately ±2 degrees for any given elevation angle in the range. However, the reading of sensor 14 is repeatable at any given elevation angle in its range to ±0.008 degrees so that, once measured elevation angle as indicated by the AC voltage output of sensor 14 is calibrated with respect to true elevation angle at various elevation angles, any subsequently measured elevation angle can be converted to a corresponding true elevation angle to an accuracy of ±0.48 arcminutes (an accuracy of at least 1 arcminute is required for navigation).

Figure 4:
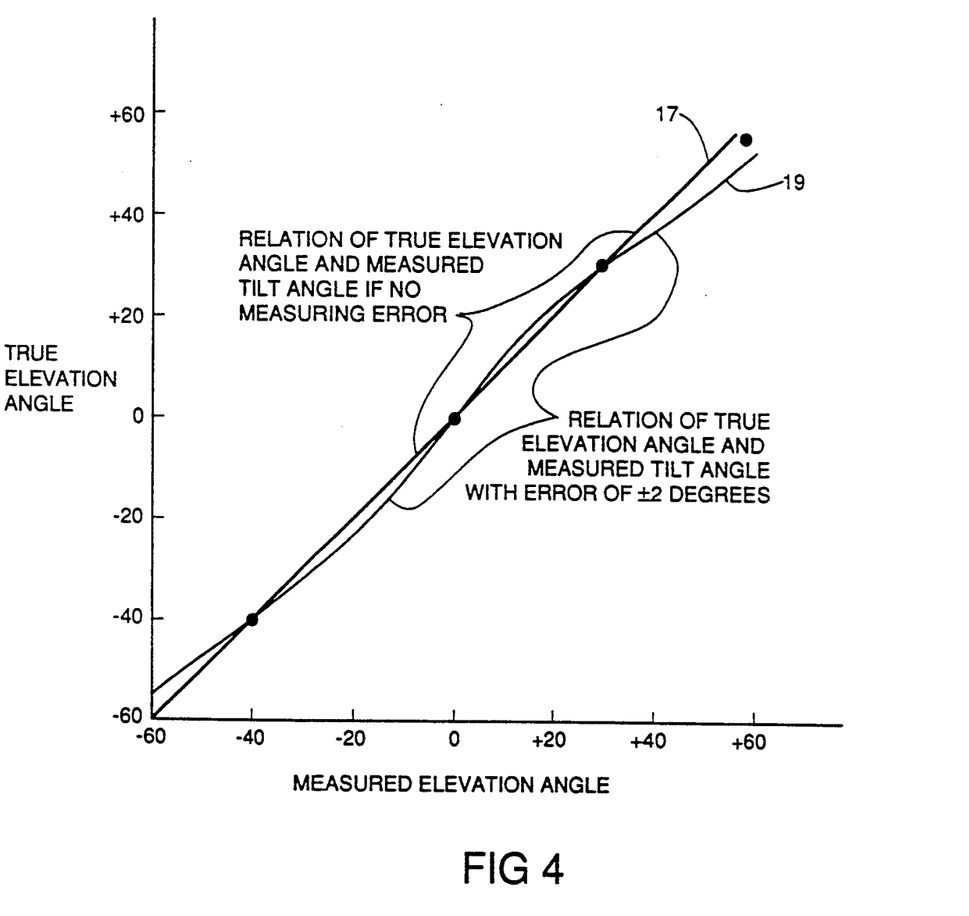
FIG. 4 is a graph of measured elevation angle against true elevation angle.

Referring to FIG. 4, true elevation angle and measured elevation angle would be the same at all angles if there were no measurement error, as indicated by line 17. In actuality, at many elevation angles measured elevation and true elevation differ. Line 19 shows an example of the divergence of measured elevation from true elevation for a hypothetical sensor with a measurement error of no greater than ±2 degrees over the entire ±60 degree elevation angle range of the elevation-angle sensing instrument 10 from beyond vertical to beyond horizontal.

Figure 5:
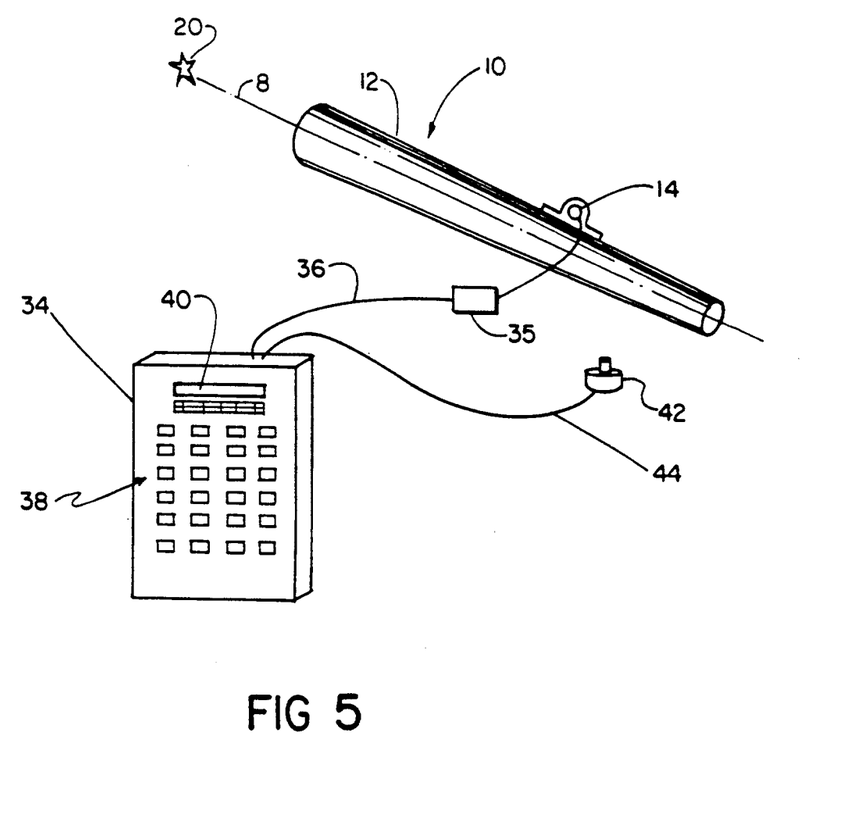
FIG. 5 is a schematic drawing of a celestial navigation system.

Referring to FIG. 5, elevation-angle sensing instrument 10 is connected, for purposes of control, calibration, and measurement, through signal conditioner 35 by a 3-conductor line 36 to a calculator 34 (Hewlett-Packard Model HP-41CX with NAV software available from Kuau Technology, Ltd., 307 South Alu Road, Wailuku, Hi.) which includes a keypad 38, a display 40, a coordinated universal time unit (not shown), and processor (not shown). Signal conditioner 35 provides constant excitation voltage to sensor 14 while serving as a line driver and preamplifier for the output voltage of the sensor on command. A command button 42 is connected by a line 44 to calculator 34.

Figure 6:
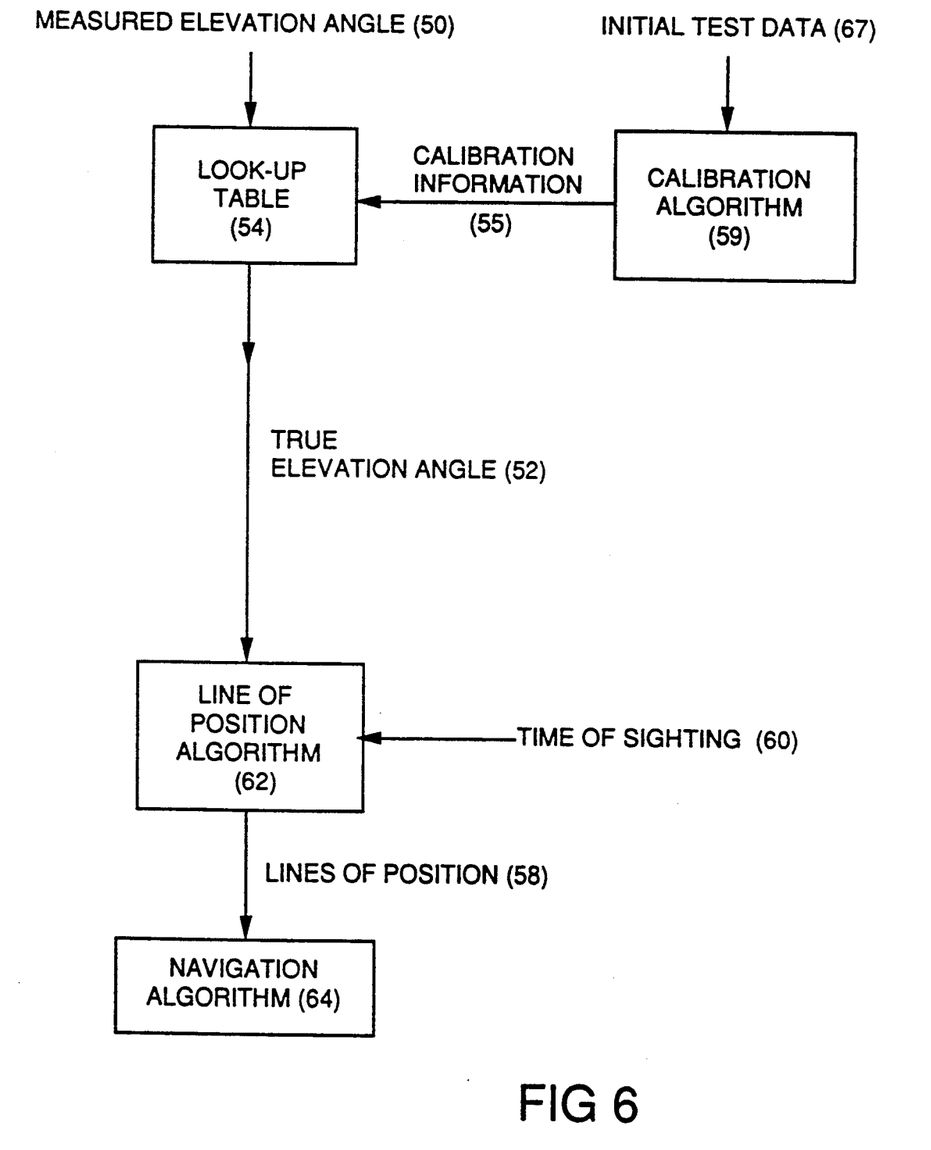
FIG. 6 is flow chart of the steps of the processor.

Referring to FIG. 6, the calculator is programmed to convert the measured elevation angle 50 to true elevation angle 52 using electronic look-up table 54. The look-up table is generated based on calibration information derived from initial data which correlates measured AC voltage outputs of sensor 14 with true elevation angle, and interpolation and error reducing procedures such as the "Cubic Spline Interpolation" routine that is part of MathCAD software (MathSoft, Inc., 1 Kendall Square, Cambridge, Mass.). The calculator then converts true elevation angle to the celestial height of celestial body 20 using the premeasured angle between axis 24 and optical axis 18, and calculates a line of position based on derived celestial height and the time of its measurement (using, for example, NAVPAC software available from Hewlett-Packard and controlled by NAV software). Additional lines of position may be ascertained by sighting other celestial bodies. A position can then be determined by a navigation algorithm (for example, "NAVPAC for Yachtsmen" software available from Hewlett-Packard and Louis Valier, Honolulu, Hi.).

In operation, a user enters into the calculator 34, through control keypad 38, an estimate of current position and information about a planned sighting including the celestial body to be sighted, whether location is to be calculated based on a single or multiple sightings, and whether location is to be displayed or stored. The user then aims at celestial body 20 along the optical axis 18 of telescope 12 and pushes the command button 42, which causes (a) the coordinated universal time unit to transmit the time of the sighting to the processor and (b) the signal conditioner 35 to read the output voltage of sensor 14. The sensor's output voltage is converted by the signal conditioner into a signal suitable for, and is provided to, the circuitry of the digital processor.

Referring to FIG. 6, the circuitry of digitized calculator 34 (a) converts measured elevation angle 50, as reflected by the digitized signal from the signal conditioner, into derived true elevation angle 52 in a format ("celestial height") needed by algorithms 62, 64 using prepared look-up table 54 and the premeasured angle between axis 24 and optical axis 18; (b) calculates a line of position 58 from celestial height and the time of the sighting 60 using a line of position algorithm 62, and (c) combines a line of position 58 with other lines of position or dead reckoning positions to fix latitude and longitude using navigation algorithm 64. Latitude and longitude are shown on display 40 and/or stored.

Other embodiments are within the following claims. For example, referring again to FIG. 1, telescope 12 can be equipped with a removable sun filter 66 to prevent eye damage during sun sights and with an eye piece 68 containing a cross-hair reticle to allow accurate sightings, or can be replaced with an infrared image converter to take sun sights through solid cloud cover.

Elevation-angle sensing instrument 10 also can be used in construction and surveying for determining, for example, the elevation of a point (such as the top of a building or a landmark). The true elevation angle 52 to a point whose elevation is to be determined is ascertained by directing the optical axis 18 of telescope 12 toward the point and converting the elevation angle as measured by sensor 14 to a true elevation angle using a look-up table and the premeasured angle between axis 24 and optical axis 18. The true elevation angle is then combined with other information (for example, the distance from the elevation-angle sensing instrument to the point to be measured and the elevation of the instrument) to calculate the elevation of the point being measured. In surveying, an accuracy of at least 0.1 degrees is required, and so an electrolytic tilt sensor with repeatability of 0.1 degrees and a look-up table accurate to 0.1 degrees will suffice.

I claim:

1. An elevation-angle sensing instrument, comprising
   a sighting device having an optical axis for aiming at an object,
   an electronic elevation-angle sensor attached to said sighting device, said electronic elevation-angle sensor having an electrical characteristic whose value is indicative of an elevation angle of said optical axis and having a repeatability of at least 6 arcminutes over an angular range of said electronic elevation-angle sensor, and
   means for correlating a value of said electrical characteristic with a true elevation angle of said optical axis based on calibration information for said sensor, said true elevation angle being accurate to at least ±6 arcminutes over said angular range of said sensor.

2. The instrument of claim 1, wherein said electronic elevation-angle sensor has a repeatability of at least 1 arcminute over said angular range.

3. The instrument of claim 1, wherein said angular range is at least ±30 degrees from an axis of said electronic elevation-angle sensor.

4. The instrument of claim 1 wherein said angular range is at least ±60 degrees from an axis of said electronic elevation-angle sensor.

5. The instrument of claim 1 wherein said sighting device comprises a telescope.

6. The instrument of claim 1 wherein said electronic elevation-angle sensor comprises an electrolytic tilt sensor.

7. The instrument of claim 1 wherein said sighting device comprises an infrared image convertor.

8. The instrument of claim 2, wherein said true elevation angle is accurate to at least ±1 arcminute over said angular range of said sensor.

9. A sextant, comprising
   a sighting device having an optical axis for aiming at an object,
   an electrolytic tilt sensor attached to said sighting device and having an angular range of at least ±30 degrees from an axis of said electrolytic tilt sensor and a repeatability of at least 6 arcmiutes over said angular range, and
   means for correlating an output of said sensor with a true elevation angle of said optical axis based on calibration information for said sensor, said true elevation angle being accurate to at least ±6 arcminutes over said angular range of said sensor.

10. The sextant of claim 9 wherein said electrolytic tilt sensor has an angular range of at least ±60 degrees from said axis of said electrolytic tilt sensor and a repeatability of at least 1 arcminute over said angular range.

11. The sextant of claim 9, wherein said electrolytic tilt sensor has a repeatability of at least ±1 arcminute over said angular range.

12. The sextant of claim 11, wherein said true elevation angle is accurate to at least ±1 arcminute over said angular range of said sensor.

13. An elevation-angle sensing system, comprising
    an elevation-angle sensing instrument including
    a sighting device having an optical axis for aiming at an object and
    an electronic elevation-angle sensor attached to said sighting device, said electronic elevation-angle sensor having an electrical characteristic whose value is indicating of an elevation angle of an axis of said electronic elevation-angle sensor and having a repeatability of at least 6 arcminutes over an angular range of said electronic elevation-angle sensor, and
    a processor for deriving an elevation angle from said electrical characteristic by correlating said electric characteristic with a true elevation angle of said axis of said sensor based on calibration information for said sensor, said true elevation angle being accurate to at least ±6 arcminutes over said angular range of said sensor.

14. The system of claim 13 wherein said processor comprises means for deriving a true elevation angle from said electrical characteristic.

15. The system of claim 14 wherein said means comprises a look-up table.

16. The system of claim 13 wherein said processor comprises means for deriving a celestial height of a celestial body from said electrical characteristic.

17. The system of claim 13 further comprising a clock connected to said processor and having an electric output indicative of time.

18. The system of claim 17 wherein said processor comprises means for deriving a line of position from said electrical characteristic and said electric output.

19. The system of claim 17 wherein said processor comprises means for deriving a position on the surface of the earth from said electrical characteristic and said electric output.

20. The system of claim 13 wherein said electronic elevation-angle sensor has a repeatability of at least 1 arcminute over said angular range.

21. The system of claim 13 wherein said electronic elevation-angle sensor has an angular range of at least ±30 degrees from an axis of said electronic elevation-angle sensor.

22. The system of claim 13 wherein said electronic elevation-angle sensor has an angular range of at least ±60 degrees from an axis of said electronic elevation-angle sensor.

23. The system of claim 13 wherein said sighting device comprises a telescope.

24. The system of claim 13 wherein said electronic elevation-angle sensor comprises an electrolytic tilt sensor.

25. The system of claim 24 wherein said sighting device comprises a telescope.

26. The system of claim 24 wherein said sighting device comprises an infrared image converter.

27. The system of claim 13 further comprising a display connected to said processor.

28. The system of claim 13 wherein said sighting device comprises an infrared image converter.

29. The system of claim 20, wherein said true elevation angle is accurate to at least ±1 arcminute over said angular range of said sensor.

* * * * *